US012054355B2

(12) United States Patent
Keshri et al.

(10) Patent No.: US 12,054,355 B2
(45) Date of Patent: Aug. 6, 2024

(54) AUTOMATIC COGNITIVE ANALYSIS OF ELEVATORS TO REDUCE PASSENGER WAIT TIME

(71) Applicant: OTIS ELEVATOR COMPANY, Farmington, CT (US)

(72) Inventors: Amit Keshri, Telanagana (IN); Paras Kumar Halingale, Hyderabad (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1506 days.

(21) Appl. No.: 16/391,864

(22) Filed: Apr. 23, 2019

(65) Prior Publication Data

US 2019/0322482 A1 Oct. 24, 2019

(30) Foreign Application Priority Data

Apr. 24, 2018 (IN) ............................ 201811015455

(51) Int. Cl.
*B66B 1/34* (2006.01)
*B66B 1/24* (2006.01)

(52) U.S. Cl.
CPC .......... *B66B 1/2458* (2013.01); *B66B 1/3476* (2013.01); *B66B 2201/226* (2013.01);
(Continued)

(58) Field of Classification Search
CPC ..... B66B 1/468; B66B 1/2458; B66B 1/2408; B66B 2201/211; B66B 3/00;
(Continued)

(56) References Cited

U.S. PATENT DOCUMENTS 5,168,136 A 12/1992 Thangavelu et al.
5,241,142 A 8/1993 Thangavelu
(Continued)

FOREIGN PATENT DOCUMENTS

CN 1217700 A * 5/1999 ........... B66B 1/2458
CN 103648949 A 3/2014
(Continued)

OTHER PUBLICATIONS

EP Search Report; EP Application No. 19169962.8; dated Oct. 22, 2019; 7 pages.

(Continued)

*Primary Examiner* — Marlon T Fletcher
(74) *Attorney, Agent, or Firm* — CANTOR COLBURN LLP

(57) ABSTRACT

A method of operating a building elevator system within a building having a plurality of floors is provided. The method including: controlling a first elevator group composed of one or more elevator systems configured to serve a plurality of floors within a first sector, the one or more elevator systems in the first elevator group further include a first elevator car; controlling a second elevator group composed of one or more elevator systems configured to serve a plurality of floors within a second sector, the one or more elevator systems in the second elevator group further include a second elevator car; monitoring usage of the first elevator group and second elevator group; and reassigning at least one of the one or more elevator systems of the second elevator group to the first elevator group in response to usage of the first elevator group and usage of the second elevator group.

18 Claims, 4 Drawing Sheets

(52) U.S. Cl.
CPC ... *B66B 2201/243* (2013.01); *B66B 2201/301* (2013.01); *B66B 2201/302* (2013.01); *B66B 2201/401* (2013.01); *B66B 2201/402* (2013.01)

(58) Field of Classification Search
CPC ................ B66B 2201/222; B66B 1/34; B66B 2201/403; B66B 5/0018; B66B 1/3446; B66B 5/0012; B66B 2201/402; B66B 1/3415; B66B 2201/215; B66B 1/2466; B66B 5/0006; B66B 2201/301; B66B 2201/233; B66B 2201/306; B66B 2201/226; B66B 2201/223; B66B 1/52; B66B 2201/4607; B66B 11/001; B66B 7/043
See application file for complete search history.

(56) References Cited

U.S. PATENT DOCUMENTS

| | | | |
|---|---|---|---|
| 5,260,526 | A | 11/1993 | Sirag, Jr. |
| 5,276,295 | A | 1/1994 | Kameli |
| 5,298,696 | A | 3/1994 | Okataku et al. |
| 5,300,739 | A | 4/1994 | Bittar |
| 5,329,076 | A | 7/1994 | Kameli |
| 5,354,957 | A | 10/1994 | Robertson |
| 5,672,853 | A | 9/1997 | Whitehall et al. |
| 5,714,725 | A | 2/1998 | Thangavelu |
| 5,750,946 | A | 5/1998 | Thangavelu |
| 5,767,460 | A | 6/1998 | Thangavelu |
| 5,767,462 | A | 6/1998 | Thangavelu |
| 5,786,551 | A | 7/1998 | Thangavelu |
| 5,841,084 | A | 11/1998 | Thangavelu |
| 5,923,004 | A | 7/1999 | Whitehall et al. |
| 6,237,721 | B1 | 5/2001 | Siikonen |
| 6,235,178 | B1 | 12/2001 | Hikita et al. |
| 7,014,015 | B2 | 3/2006 | Nikovski et al. |
| 7,549,517 | B2 | 6/2009 | Stanley et al. |
| 7,735,611 | B2 | 6/2010 | Tynai |
| 8,104,585 | B2 | 1/2012 | Smith et al. |
| 8,151,943 | B2 | 4/2012 | De Groot |
| 8,655,799 | B1 | 2/2014 | Rubin |
| 2001/0000395 | A1 | 4/2001 | Hikita et al. |
| 2004/0262089 | A1 | 12/2004 | Nikovski et al. |
| 2007/0045052 | A1 | 3/2007 | Stanley et al. |
| 2007/0084674 | A1 | 4/2007 | Tyni |
| 2009/0050417 | A1 | 2/2009 | De Groot |
| 2009/0133967 | A1 | 5/2009 | Smith et al. |
| 2017/0183198 | A1 | 6/2017 | Lee et al. |
| 2017/0369275 | A1 | 12/2017 | Saraswat et al. |

FOREIGN PATENT DOCUMENTS

| | | | | | |
|---|---|---|---|---|---|
| CN | 103935850 | A | | 7/2014 | |
| CN | 105502112 | A | | 4/2016 | |
| CN | 105600629 | A | | 5/2016 | |
| CN | 105883558 | A | | 8/2016 | |
| CN | 105936452 | A | | 9/2016 | |
| CN | 106061878 | A | | 10/2016 | |
| CN | 106276434 | A | | 1/2017 | |
| CN | 106315319 | A | | 1/2017 | |
| CN | 205973322 | U | | 2/2017 | |
| CN | 106660737 | A | | 5/2017 | |
| CN | 106892313 | A | | 6/2017 | |
| CN | 107235392 | A | | 10/2017 | |
| CN | 107601188 | A | | 1/2018 | |
| CN | 107683251 | A | | 2/2018 | |
| CN | 108367880 | A | | 8/2018 | |
| GB | 2313453 | A | | 11/1997 | |
| JP | 11130349 | A | * | 5/1999 | |
| JP | H11130349 | A | | 5/1999 | |
| JP | H11255439 | A | | 9/1999 | |
| JP | 3448890 | B2 | | 9/2003 | |
| JP | 2012229101 | A | | 11/2012 | |
| JP | 2012229101 | A | * | 11/2012 | |
| JP | 2017178475 | A | * | 10/2017 | ........... B66B 1/2408 |
| WO | WO-2009154618 | A1 | * | 12/2009 | ........... B66B 1/2458 |
| WO | 2015109166 | A1 | | 7/2015 | |
| WO | WO-2017006379 | A1 | * | 1/2017 | ............... B66B 1/14 |
| WO | 2017085352 | A1 | | 5/2017 | |

OTHER PUBLICATIONS

"Elevator Group Control Technology" Sep. 2006; 9 pages.
First Chinese Office Action for 201910331477.0; Office Action Issued: Mar. 1, 2021; Office Action Received: Mar. 17, 2021; 10 pages.
Second Chinese Office Action for 201910331477.0; Office Action Issued: Oct. 26, 2021; Office Action Received: Nov. 17, 2021; 11 pages.

* cited by examiner

AUTOMATIC COGNITIVE ANALYSIS OF ELEVATORS TO REDUCE PASSENGER WAIT TIME

CROSS-REFERENCE TO RELATED APPLICATIONS

This application claims the benefit of Provisional Indian Application No. 201811015455 filed Apr. 24, 2018, which is incorporated herein by reference in its entirety.

BACKGROUND

The subject matter disclosed herein relates generally to the field of elevator systems, and specifically to a method and apparatus for coordinating the operation of multiple elevator cars.

Commonly, elevator cars are organized into groups serving sectors of a building rather than each elevator car serving the overall length of an elevator shaft to service every floor of a building. Once established, sectors typically remain unchanged in the elevator system.

BRIEF SUMMARY

According to an embodiment, a method of operating a building elevator system within a building having a plurality of floors is provided. The method including: controlling a first elevator group composed of one or more elevator systems configured to serve a plurality of floors within a first sector, the one or more elevator systems in the first elevator group further include a first elevator car; controlling a second elevator group composed of one or more elevator systems configured to serve a plurality of floors within a second sector, the one or more elevator systems in the second elevator group further include a second elevator car; monitoring usage of the first elevator group; monitoring usage of the second elevator group; and reassigning at least one of the one or more elevator systems of the second elevator group to the first elevator group in response to the usage of the first elevator group and the usage of the second elevator group.

In addition to one or more of the features described herein, or as an alternative, further embodiments may include that the second elevator car is reassigned to first elevator group, and the method further includes: receiving an elevator call from a floor of the plurality of floors within the first sector; and moving the second elevator car to the floor of the plurality of floors within the first sector.

In addition to one or more of the features described herein, or as an alternative, further embodiments may include that monitoring usage of the first elevator group further includes: detecting at least one of a number of passengers using the one or more elevator systems of the first elevator group and a number of elevator calls received by the one or more elevator systems of the first elevator group.

In addition to one or more of the features described herein, or as an alternative, further embodiments may include that the number of passengers is detected using visual recognition to identify individual passengers.

In addition to one or more of the features described herein, or as an alternative, further embodiments may include that the at least one of the one or more elevator systems of the second elevator group is reassigned to the first elevator group in response to the usage of the first elevator group and the usage of the second elevator group and the time of day.

In addition to one or more of the features described herein, or as an alternative, further embodiments may include that the at least one of the one or more elevator systems of the second elevator group is reassigned to the first elevator group for a selected period of time.

In addition to one or more of the features described herein, or as an alternative, further embodiments may include: determining a pattern in the usage of the first elevator group using machine learning; and detecting an occurrence of the pattern in the usage of the first elevator group using machine learning, the one or more elevator systems of the second elevator group is reassigned to the first elevator group when the occurrence of the pattern is detected.

According to another embodiment, a control system of a building elevator system is provided. The control system including: a processor; and a memory including computer-executable instructions that, when executed by the processor, cause the processor to perform operations. The operations including: controlling a first elevator group composed of one or more elevator systems configured to serve a plurality of floors within a first sector, the one or more elevator systems in the first elevator group further include a first elevator car; controlling a second elevator group composed of one or more elevator systems configured to serve a plurality of floors within a second sector, the one or more elevator systems in the second elevator group further include a second elevator car; monitoring usage of the first elevator group; monitoring usage of the second elevator group; and reassigning at least one of the one or more elevator systems of the second elevator group to the first elevator group in response to the usage of the first elevator group and the usage of the second elevator group.

In addition to one or more of the features described herein, or as an alternative, further embodiments may include that the second elevator car is reassigned to first elevator group, and the operations further include: receiving an elevator call from a floor of the plurality of floors within the first sector; and moving the second elevator car to the floor of the plurality of floors within the first sector.

In addition to one or more of the features described herein, or as an alternative, further embodiments may include that monitoring usage of the first elevator group further includes: detecting at least one of a number of passengers using the one or more elevator systems of the first elevator group and a number of elevator calls received by the one or more elevator systems of the first elevator group.

In addition to one or more of the features described herein, or as an alternative, further embodiments may include that the number of passengers is detected using visual recognition to identify individual passengers.

In addition to one or more of the features described herein, or as an alternative, further embodiments may include that the at least one of the one or more elevator systems of the second elevator group is reassigned to the first elevator group in response to the usage of the first elevator group and the usage of the second elevator group and the time of day.

In addition to one or more of the features described herein, or as an alternative, further embodiments may include that the at least one of the one or more elevator systems of the second elevator group is reassigned to the first elevator group for a selected period of time.

In addition to one or more of the features described herein, or as an alternative, further embodiments may include that the operations further include: determining a pattern in the usage of the first elevator group using machine learning; and detecting an occurrence of the pattern in the usage of the first elevator group using machine learning, the one or more elevator systems of the second elevator group is reassigned to the first elevator group when the occurrence of the pattern is detected.

According to another embodiment, a computer program product tangibly embodied on a computer readable medium is provided. The computer program product including instructions that, when executed by a processor, cause the processor to perform operations including: controlling a first elevator group composed of one or more elevator systems configured to serve a plurality of floors within a first sector, the one or more elevator systems in the first elevator group further include a first elevator car; controlling a second elevator group composed of one or more elevator systems configured to serve a plurality of floors within a second sector, the one or more elevator systems in the second elevator group further include a second elevator car; monitoring usage of the first elevator group; monitoring usage of the second elevator group; and reassigning at least one of the one or more elevator systems of the second elevator group to the first elevator group in response to the usage of the first elevator group and the usage of the second elevator group.

In addition to one or more of the features described herein, or as an alternative, further embodiments may include that the second elevator car is reassigned to first elevator group, and the operations further include: receiving an elevator call from a floor of the plurality of floors within the first sector; and moving the second elevator car to the floor of the plurality of floors within the first sector.

In addition to one or more of the features described herein, or as an alternative, further embodiments may include that monitoring usage of the first elevator group further includes: detecting at least one of a number of passengers using the one or more elevator systems of the first elevator group and a number of elevator calls received by the one or more elevator systems of the first elevator group.

In addition to one or more of the features described herein, or as an alternative, further embodiments may include that the number of passengers is detected using visual recognition to identify individual passengers.

In addition to one or more of the features described herein, or as an alternative, further embodiments may include that the at least one of the one or more elevator systems of the second elevator group is reassigned to the first elevator group in response to the usage of the first elevator group and the usage of the second elevator group and the time of day.

In addition to one or more of the features described herein, or as an alternative, further embodiments may include that the at least one of the one or more elevator systems of the second elevator group is reassigned to the first elevator group for a selected period of time.

Technical effects of embodiments of the present disclosure include using machine learning to divide an elevator's operational route into sectors and reassigning elevator cars among sectors in response to elevator call traffic prediction.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
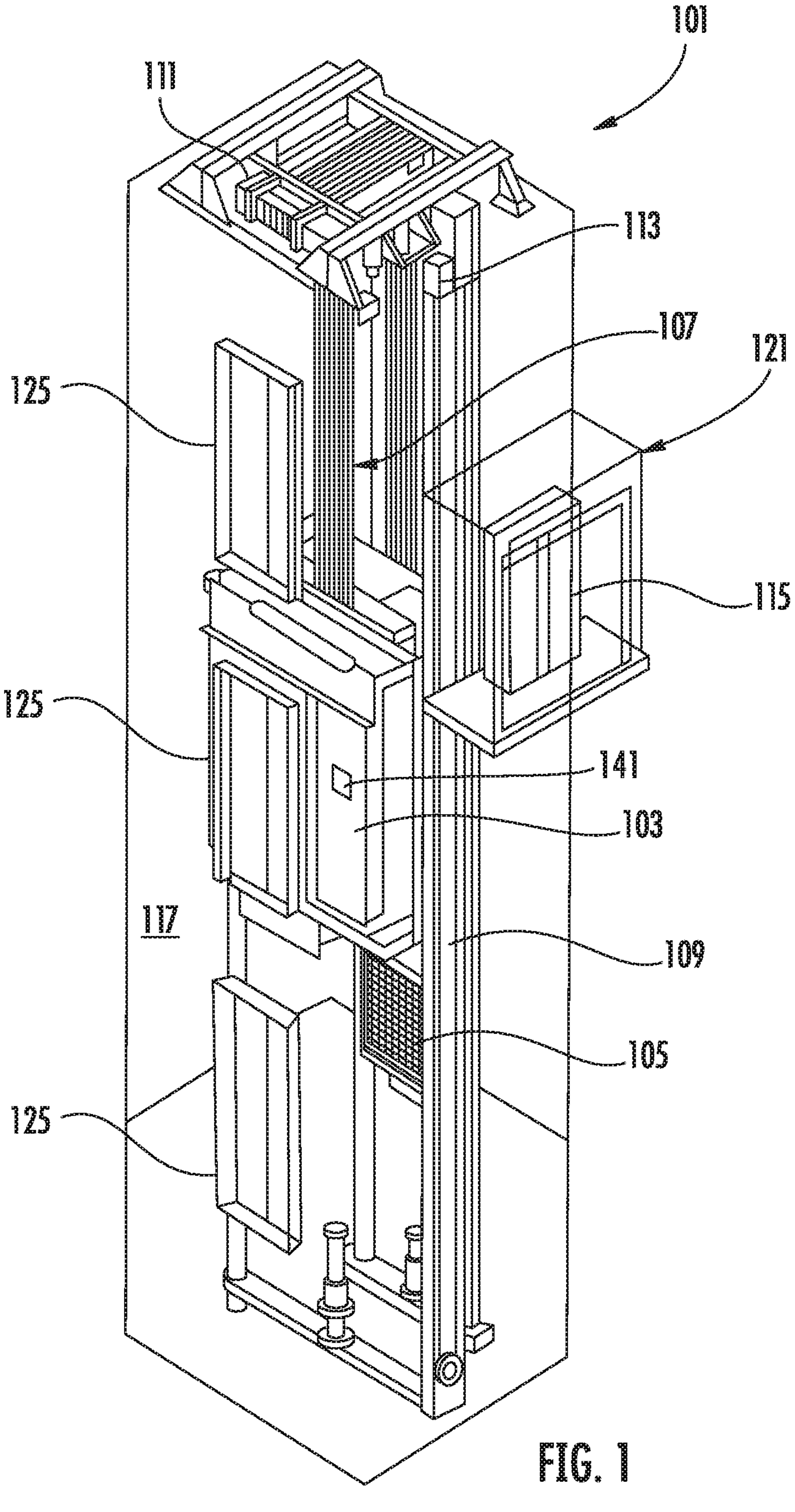
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

The elevator system 100 may also include a sensor system 141 configured to detect a number of passengers within the elevator car 103 in real-time. The sensor system 141 is in operative communication with the controller 115. Advantageously, detecting a number of passengers within the elevator car 103 in real-time helps the controller 115 detect overall usage of the elevator system 101. The sensor system 141 may use a variety of sensing mechanisms located either on the elevator car 103 or proximate an elevator landing 125 (e.g., in hallway near an elevator hoistway 117). The sensor systems 141 may use a variety of sensing mechanisms such as, for example, a visual detection device, a weight detection device, a laser detection device, a door reversal monitoring device, a thermal image detection device, and a depth detection device. The visual detection device may be a camera (e.g., a still image camera, a video camera, etc.) that utilizes visual recognition to identify individual passengers and objects in the elevator car 103 and then determine a number of passengers within the elevator car 103. The weight detection device may be a scale to sense the amount of weight in an elevator car 103 and then determine the number of passengers within the elevator car 103. The laser detection device may detect how many passengers walk through a laser beam to determine the number of passengers within the elevator car 103. Similarly, a door reversal monitoring device also detects passengers entering the car so as not to close an elevator door on a passenger and thus may be used to determine a number of passengers within the elevator car 103. The thermal detection device may be an infrared or other heat sensing camera that utilizes detected temperature to identify individual passengers and objects in the elevator car 103 and then determine a number of passengers within the elevator car 103. The depth detection device may be a 2-D, 3-D or other depth/distance detecting camera that utilizes detected distance to an object and/or passenger to determine a number of passengers within the elevator car 103. As may be appreciated by one of skill in the art, in addition to the stated methods, additional methods may exist to determine the number of passengers within the elevator car 103 and one or any combination of these methods may be used to determine a number of passengers within the elevator car 103.

Figure 2:
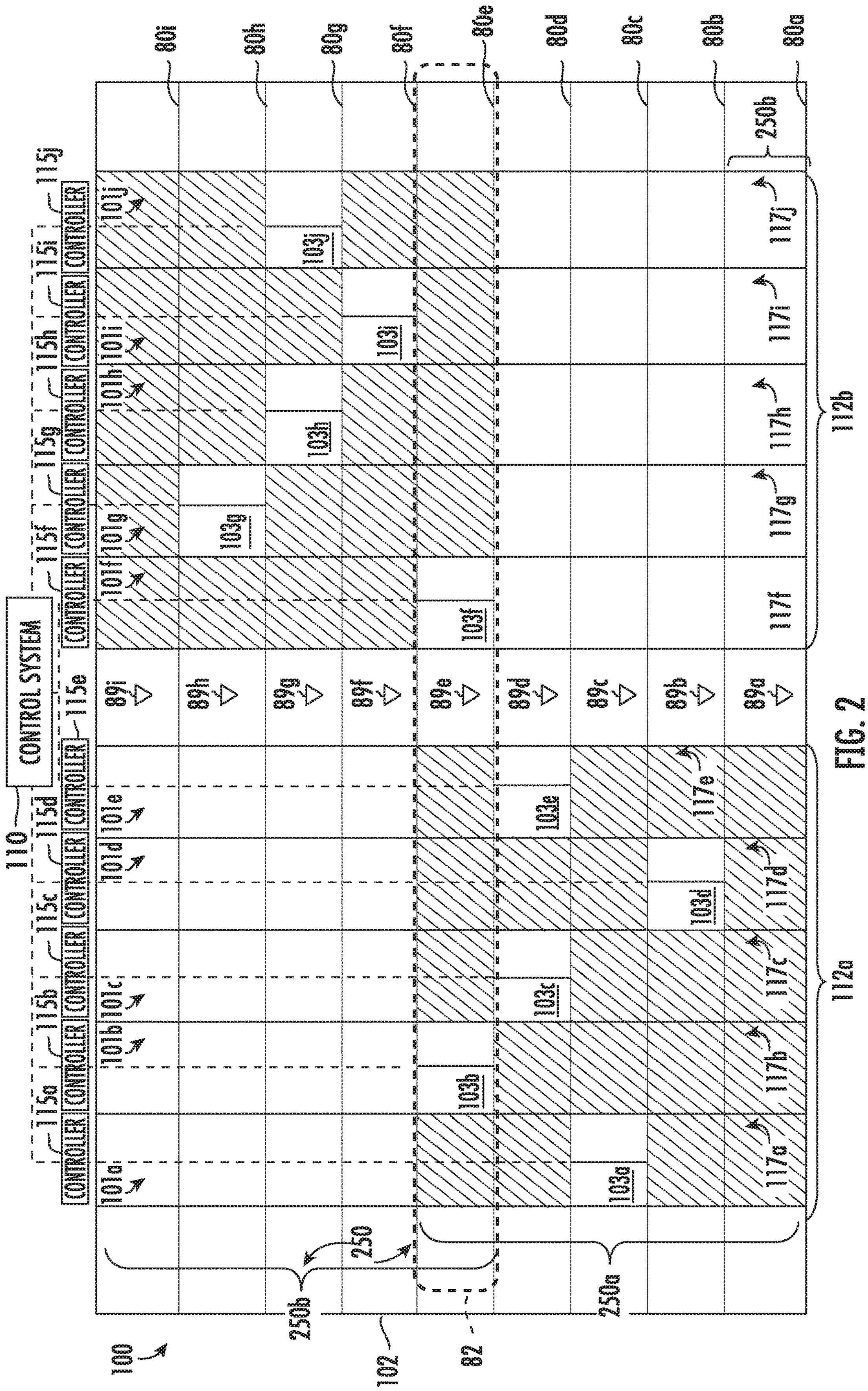
FIG. 2 illustrates a schematic view of a building elevator system, in accordance with an embodiment of the disclosure.
Figure 3:
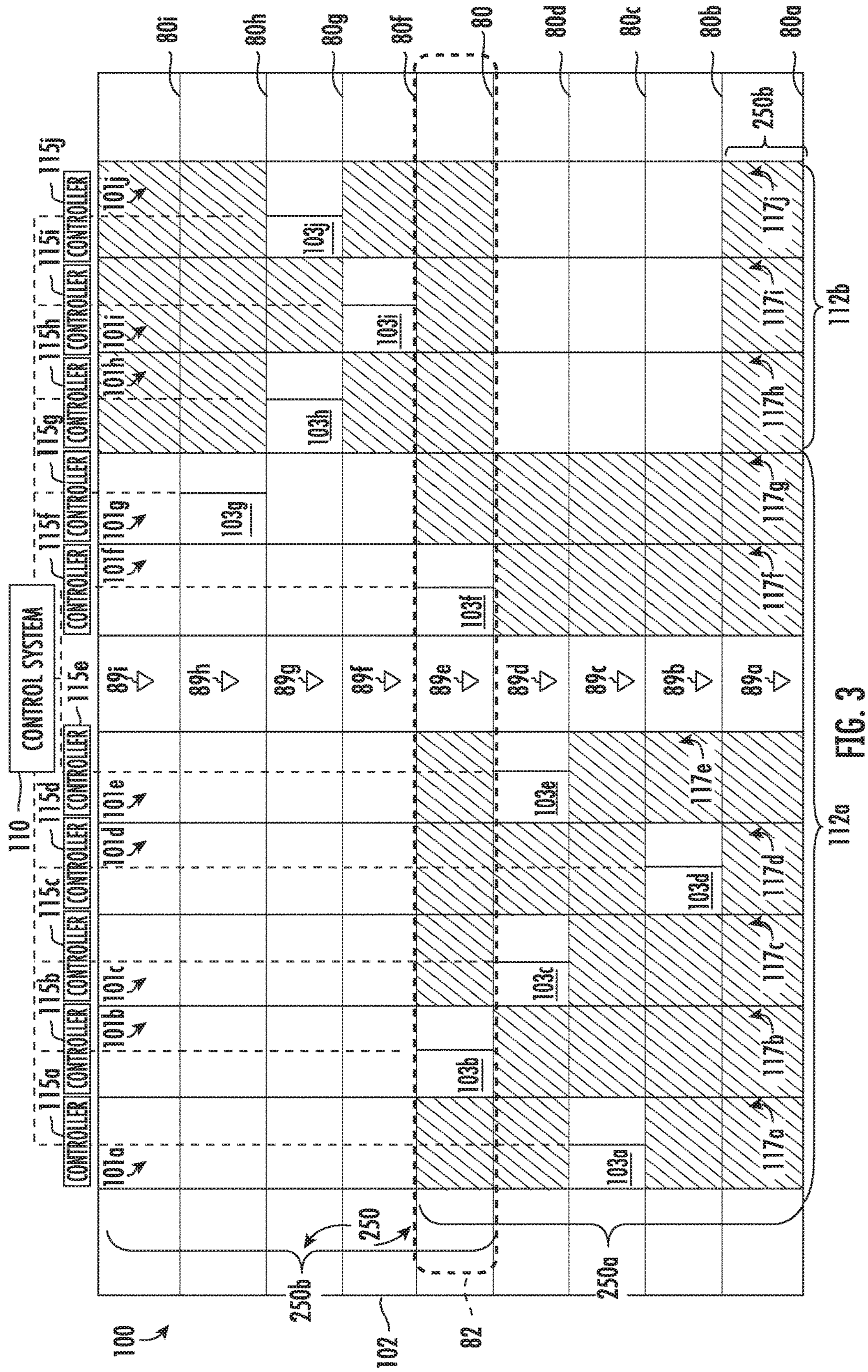
FIG. 3 illustrates a schematic view of a building elevator system after two elevator systems have been reassigned to a new group, in accordance with an embodiment of the disclosure.

Referring now to FIGS. 2-3 with continued reference to FIG. 1. As seen in FIG. 2, a building elevator system 100 within a building 102 may include multiple different individual elevators systems 101*a*-101*j* organized in elevator groups 112*a*-112*b*. It is understood that while ten elevator systems 101*a*-101*j* are utilized for exemplary illustration, embodiments disclosed herein may be applied to building elevator systems 100 having two or more elevator systems 101 organized in one or more elevator groups 112*a*-112*b*. It is also understood that while nine floors 80*a*-80*i* are utilized for exemplary illustration, embodiments disclosed herein may be applied to building elevator systems 100 having any number of floors.

Further, the elevator systems 101*a*-101*j* illustrated in FIG. 2 are organized into two elevator groups 112*a*-112*b* for ease of explanation, however it is understood that the elevator systems 101*a*-101*j* organized into one or more elevator groups 112*a*-112*b*. Each elevator group 112*a*-112*b* may contain one or more elevator systems 101. Upon initial installation, the building elevator system 100 may be organized into two elevator groups 112*a*-112*b* and each elevator group 112*a*-112*b* may have five elevator systems 101*a*-101*j*, as seen in FIG. 2. A first elevator group 112*a* may serve a first sector 250*a* (i.e., a lower sector) comprising floors 80*a*-80*e*. A second elevator group 112*b* serve a second sector 250*b* (i.e., a higher sector) comprising floors 80*e*-80*i*. The second elevator group 112*b* may also transfer elevator cars from the second sector 250*b* to a bottom or exit floor 80*a*.

Each floor 80*a*-80*i* in the building 102 of FIG. 2 may have a destination entry device 89*a*-89*i*. The elevator destination entry device 89*a*-89*i* sends an elevator call to the control system 110 including the source of the elevator call and the destination of the elevator call. There may be one or more destination entry devices 89*a*-89*i* per floor. The destination entry device 89*a*-89*i* may serve one or more elevator groups 112*a*-112*b* or there may be a destination entry device 89*a*-89*i* for each elevator group 112*a*-112*b*. The destination entry device 89*a*-89*i* may be a push button and/or a touch screen and may be activated manually or automatically. For example, the elevator call may be sent by an individual entering the elevator call via the destination entry device 89*a*-89*i*. The destination entry device 89*a*-89*i* may also be activated to send an elevator call by voice recognition or a passenger detection mechanism in the hallway, such as, for example a weight sensing device, a visual recognition device, and a laser detection device. The destination entry device 89*a*-89*i* may be activated to send an elevator call through an automatic elevator call system that automatically initiates an elevator call when an individual is determined to be moving towards the elevator system in order to call an elevator or when an individual is scheduled to activate the destination entry device 89*a*-89*i*. The destination entry device 89*a*-89*i* may also be an application on a mobile device belonging to an individual that allows the individual to call an elevator car 103 both manually and automatically.

The control system 110 is operably connected to the controller 115*a*-115*j* of each elevator system 101*a*-101*j*. The controllers 115*a*-115*j* can be combined, local, remote, cloud, etc. The control system 110 is configured to the control and coordinate operation of multiple elevator systems 101*a*-101*j*. The control system 110 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The elevator systems 101*a*-101*j* may be manually assigned to sectors 250 and the control system 110 is configured to reorganize the elevators systems 101 among the sectors 250*a*-250*b* in response to elevator usage within each sector 250. Each elevator car 103*a*-103*f* may be used to transport individuals within a specific sector 250. Each sector 250 may be made up of a group of contiguous floors. The elevator floors 80*a*-80*i* may be organized into a first sector 250*a* that includes floors 80*a*-80*e* and a second sector 250*b* that includes floors 80*e*-80*i*. The first sector 250*a* and the second sector 250*b* may overlap at a transfer floor 82 (e.g., sky lobby). Buildings 102 may have multiple transfer floors that allow passengers to transfer from an elevator system serving one sector to another elevator system serving another sector. In the example illustrated in FIG. 2, passengers may enter the building 102 on floor 80*a*, board an elevator car 103*a*-103*e* in the first elevator group 112*a* that serves the first sector 250*a* (i.e. lower sector) take the elevator car 103*a*-103*e* up to the transfer floor 82 and then board an elevator car 103*f*-103*j* in the second elevator group 112*b* that serves the second sector 250*b* (i.e. upper sector) to travel to any floor 80*f*-80*i* in the second sector 250*b*.

In an embodiment, the control system 110 may assigned elevator system 101*a*-101*j* into sectors 250 in response to usage of the building elevator system 100. The usage of the building elevator system 100 may be based upon at least one of elevator calls received and a count of passengers using each elevator system 101*a*-101*j* in each sector sectors 250*a*-250*b*. In an embodiment, the control system 110 may monitor usage of the building elevator system 100 over a selected period of time and suggest an assignment of elevator systems 101*a*-101*j* to sectors 250*a*-250*b*. An elevator manager or technician may then evaluate the suggestion and manually reassign the elevator system 101*a*-101*j* to new sectors 250*a*-250*b*. In another embodiment, the control system 110 may monitor usage of the building elevator system 100 over a selected period of time and automatically reassign elevator systems 101*a*-101*j* to sectors 250*a*-250*b*. The control system 110 may use machine learning to monitor usage of the building elevator system 100 and then determined reassignments of elevator systems 101*a*-101*j* to sectors 250*a*-250*b*. The usage of the building elevator system 100 may be captured (locally, remotely, or cloud) and machine learning algorithms will be built to identify patterns. Then the control system 110 may automatically reassign the elevator systems 101*a*-101*j* in response to patterns detected. For example, during a particular time of day, the building elevator system 100 may experience an increased usage of the elevator cars 103*a*-103*e* in the first sector 250*a*, thus the control system 110 may reassign two elevator systems 115*f*-115*g* from the second elevator group 112*b* to the first elevator group 112*a* so that the two elevator systems 115*f*-115*g* may serve the first sector 250*a*, as seen in FIG. 3. The selected period of time may be a learning period during typical elevator usage may be monitored and learnt using machine learning. The learning period may a week, a month, few months, etc. In another embodiment, the elevator systems 101*a*-101*j* may be dynamically assigned to sectors in real-time. For example, the first sector 250 may be experiencing a high demand and thus elevators systems 115*f*-115*j* currently serving the second sector 250*b* may be reassigned in real-time to the first sector 250*a* to help accommodate the demand, as seen in FIG. 3. In an embodiment, the control system 110 may reassign elevator system 101*a*-101*j* into different sectors 250 in response to a time of day, an intensity of traffic between sectors 250, and an intensity of traffic within each sector 250.

Figure 4:
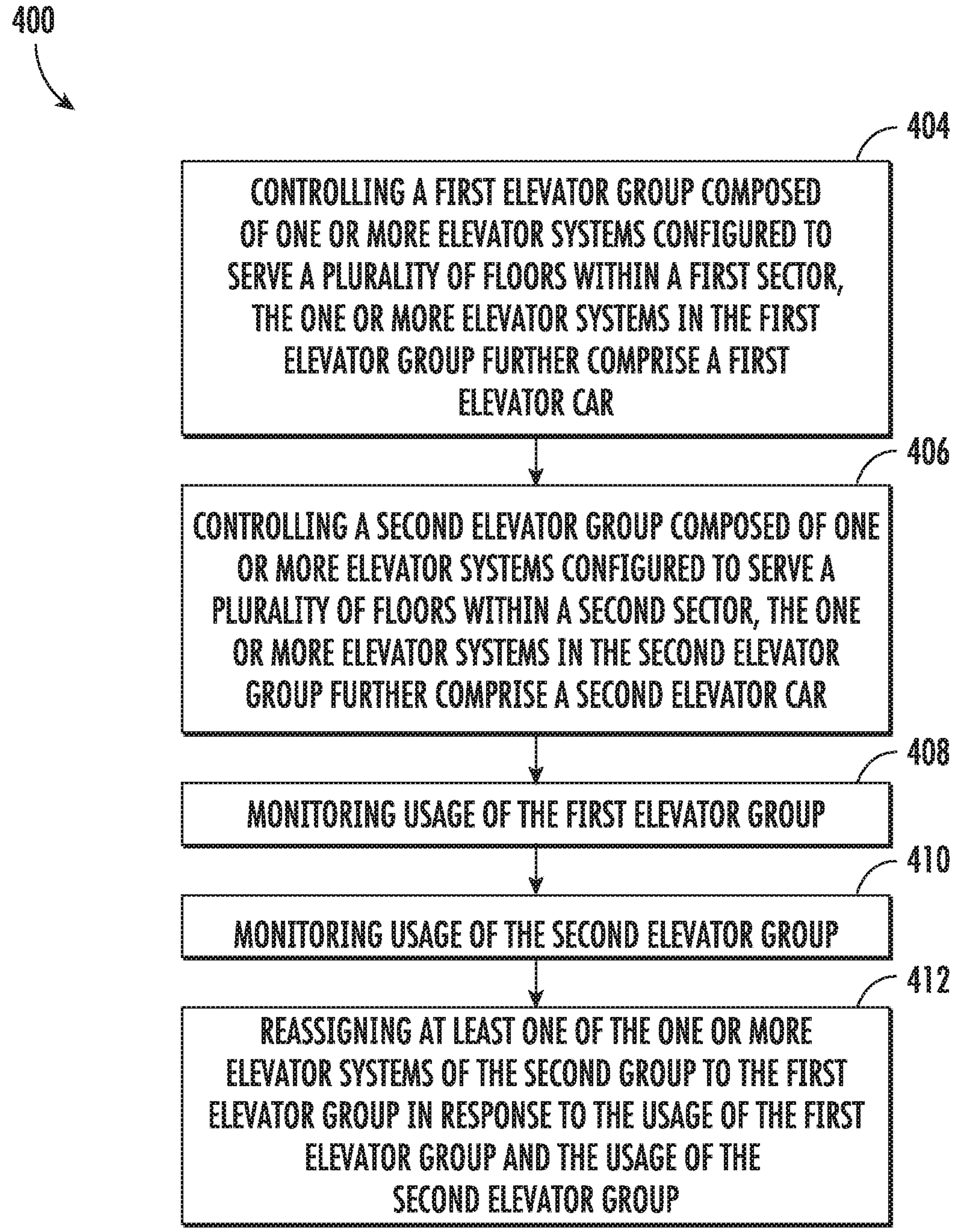
FIG. 4 is a flow chart of method of operating a building elevator system, in accordance with an embodiment of the disclosure.

Referring now to FIG. 4, while referencing components of FIGS. 1-3. FIG. 4 shows a flow chart of method 400 of operating a building elevator system 100 within a building 102 having a plurality of floors 80*a*-80*i*, in accordance with an embodiment of the disclosure. At block 404, a control system 110 controls a first elevator group 112*a* composed of one or more elevator systems 101*a*-101*e* configured to serve a plurality of floors 80*a*-80*e* within a first sector 250*a*, the one or more elevator systems 101*a*-101*e* in the first elevator group 112*a* further comprise a first elevator car 101*a*. At block 406, the control system 110 controls a second elevator group 112*b* composed of one or more elevator systems 101*f*-101*i* configured to serve a plurality of floors 80*e*-80*i* within a second sector 250*b*, the one or more elevator systems 101*f*-101*i* in the second elevator group 112*b* further comprise a second elevator car 101*f*.

At block 408, the control system 110 monitors usage of the first elevator group 112*a*. The control system 110 may monitor usage by detecting at least one of a number of passengers using the one or more elevator systems 101*a*-101*e* of the first elevator group 112*a* and a number of elevator calls received by the one or more elevator systems 101*a*-101*e* of the first elevator group 112*a*. At block 410, the control system 110 monitors usage of the second elevator group 112*b*. The control system 110 may monitor usage by detecting at least one of a number of passengers using the one or more elevator systems 101*f*-101*j* of the second elevator group 112*b* and a number of elevator calls received by the one or more elevator systems 101*f*-101*j* of the second elevator group 112*b*. In an embodiment, the number of passengers may be detected using visual recognition to identify individual passengers.

At block 412, the control system 110 reassigns at least one of the one or more elevator systems 101*f*-101*i* of the second elevator group 112*b* to the first elevator group 112*a* in response to the usage of the first elevator group 112*a* and the usage of the second elevator group 112*b*. In an embodiment, the at least one of the one or more elevator systems 101*f*-101*i* of the second elevator group 112*b* is reassigned to the first elevator group 112*a* in response to the usage of the first elevator group 112*a* and the usage of the second elevator group 112*b* and the time of day. For example, an elevator system 101 may be reassigned to another group based on historical or real-time data on the usages of the group during that time of day. In an embodiment, the elevator system 101 may only be reassigned to another group for a selected period of time. In an example, the second elevator car 103*f* is reassigned to first elevator group 112*a*, and if an elevator call is received from a floor of the plurality of floors within the first sector 250*a* then the second elevator car 103*f* is moved to the floor of the plurality of floors within the first sector 250*a*.

The method 400 may further comprise: determining a pattern in the usage of the first elevator group 112*a* using machine learning and detecting an occurrence of the pattern in the usage of the first elevator group 112*a* using machine learning. Then the one or more elevator systems 101*f*-101*i* of the second elevator group 112*b* is reassigned to the first elevator group 112*a* when the occurrence of the pattern is detected.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments.

Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of operating a building elevator system within a building having a plurality of floors, the method comprising:

controlling a first elevator group composed of one or more elevator systems configured to serve a plurality of floors within a first sector, the one or more elevator systems in the first elevator group further comprise a first elevator car;

controlling a second elevator group composed of one or more elevator systems configured to serve a plurality of floors within a second sector, the one or more elevator systems in the second elevator group further comprise a second elevator car;

monitoring usage of the first elevator group;

monitoring usage of the second elevator group;

reassigning at least one of the one or more elevator systems of the second elevator group to the first elevator group in response to the usage of the first elevator group and the usage of the second elevator group;

determining a pattern in the usage of the first elevator group using machine learning over a period of time defining a learning period; and detecting an occurrence of the pattern in the usage of the first elevator group using machine learning, wherein the one or more elevator systems of the second elevator group is reassigned to the first elevator group when the occurrence of the pattern is detected.

2. The method of claim 1, wherein the second elevator car is reassigned to first elevator group, and wherein the method further comprises:

receiving an elevator call from a floor of the plurality of floors within the first sector; and moving the second elevator car to the floor of the plurality of floors within the first sector.

3. The method of claim 1, wherein monitoring usage of the first elevator group further comprises:

detecting at least one of a number of passengers using the one or more elevator systems of the first elevator group and a number of elevator calls received by the one or more elevator systems of the first elevator group.

4. The method of claim 3, wherein the number of passengers is detected using visual recognition to identify individual passengers.

5. The method of claim 1, wherein the at least one of the one or more elevator systems of the second elevator group is reassigned to the first elevator group in response to the usage of the first elevator group and the usage of the second elevator group and the time of day.

6. The method of claim 5, wherein the at least one of the one or more elevator systems of the second elevator group is reassigned to the first elevator group for a selected period of time.

7. A control system of a building elevator system comprising:

a processor; and a memory comprising computer-executable instructions that, when executed by the processor, cause the processor to perform operations, the operations comprising:

controlling a first elevator group composed of one or more elevator systems configured to serve a plurality of floors within a first sector, the one or more elevator systems in the first elevator group further comprise a first elevator car;

controlling a second elevator group composed of one or more elevator systems configured to serve a plurality of floors within a second sector, the one or more elevator systems in the second elevator group further comprise a second elevator car;

monitoring usage of the first elevator group;

monitoring usage of the second elevator group;

reassigning at least one of the one or more elevator systems of the second elevator group to the first elevator group in response to the usage of the first elevator group and the usage of the second elevator group;

determining a pattern in the usage of the first elevator group using machine learning over a period of time defining a learning period; and detecting an occurrence of the pattern in the usage of the first elevator group using machine learning;

wherein the one or more elevator systems of the second elevator group is reassigned to the first elevator group when the occurrence of the pattern is detected.

8. The control system of claim 7, wherein the second elevator car is reassigned to first elevator group, and wherein the operations further comprise:

receiving an elevator call from a floor of the plurality of floors within the first sector; and moving the second elevator car to the floor of the plurality of floors within the first sector.

9. The control system of claim 7, wherein monitoring usage of the first elevator group further comprises:

detecting at least one of a number of passengers using the one or more elevator systems of the first elevator group and a number of elevator calls received by the one or more elevator systems of the first elevator group.

10. The control system of claim 9, wherein the number of passengers is detected using visual recognition to identify individual passengers.

11. The control system of claim 7, wherein the at least one of the one or more elevator systems of the second elevator group is reassigned to the first elevator group in response to the usage of the first elevator group and the usage of the second elevator group and the time of day.

12. The control system of claim 11, wherein the at least one of the one or more elevator systems of the second elevator group is reassigned to the first elevator group for a selected period of time.

13. A computer program product tangibly embodied on a computer readable medium, the computer program product including instructions that, when executed by a processor, cause the processor to perform operations comprising:

controlling a first elevator group composed of one or more elevator systems configured to serve a plurality of floors within a first sector, the one or more elevator systems in the first elevator group further comprise a first elevator car;

controlling a second elevator group composed of one or more elevator systems configured to serve a plurality of floors within a second sector, the one or more elevator systems in the second elevator group further comprise a second elevator car;

monitoring usage of the first elevator group; monitoring usage of the second elevator group; and reassigning at least one of the one or more elevator systems of the second elevator group to the first elevator group in response to the usage of the first elevator group and the usage of the second elevator group;

determining a pattern in the usage of the first elevator group using machine learning over a period of time defining a learning period; and detecting an occurrence of the pattern in the usage of the first elevator group using machine learning;

wherein the one or more elevator systems of the second elevator group is reassigned to the first elevator group when the occurrence of the pattern is detected.

14. The computer program product of claim 13, wherein the second elevator car is reassigned to first elevator group, and wherein the operations further comprise:

receiving an elevator call from a floor of the plurality of floors within the first sector; and moving the second elevator car to the floor of the plurality of floors within the first sector.

15. The computer program product of claim 13, wherein monitoring usage of the first elevator group further comprises:

detecting at least one of a number of passengers using the one or more elevator systems of the first elevator group and a number of elevator calls received by the one or more elevator systems of the first elevator group.

16. The computer program product of claim 15, wherein the number of passengers is detected using visual recognition to identify individual passengers.

17. The computer program product of claim 13, wherein the at least one of the one or more elevator systems of the second elevator group is reassigned to the first elevator group in response to the usage of the first elevator group and the usage of the second elevator group and the time of day.

18. The computer program product of claim 17, wherein the at least one of the one or more elevator systems of the second elevator group is reassigned to the first elevator group for a selected period of time.

* * * * *